I. L. ROSE.
HOSE COUPLING.
APPLICATION FILED SEPT. 4, 1908.
939,096.
Patented Nov. 2, 1909.
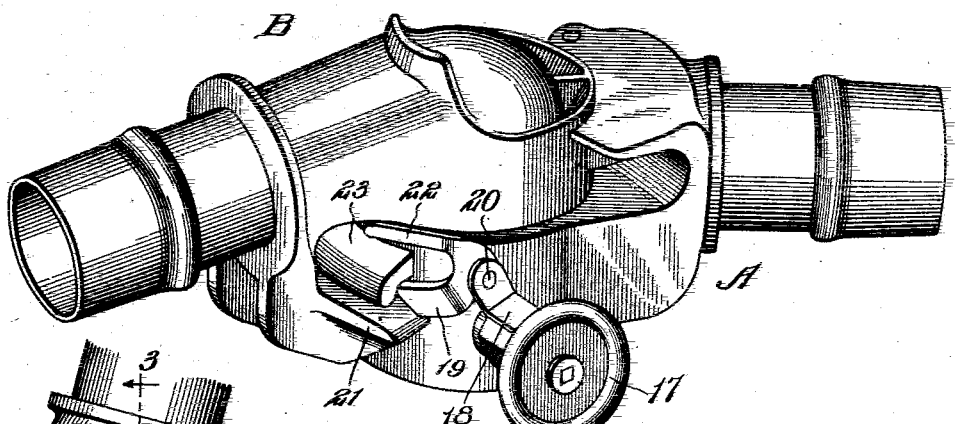
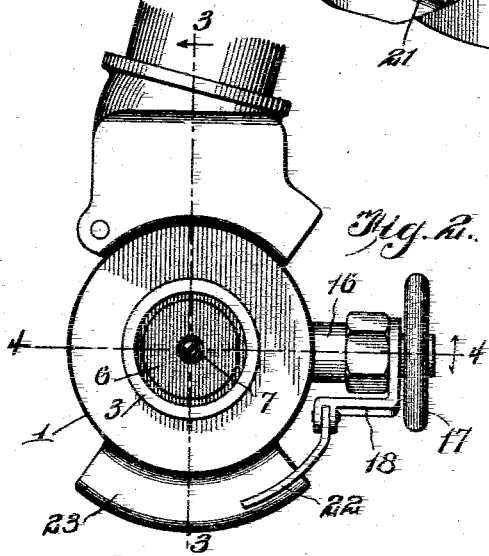
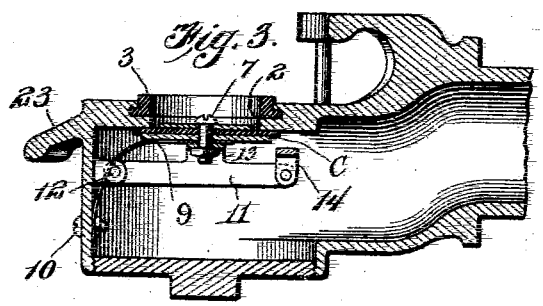
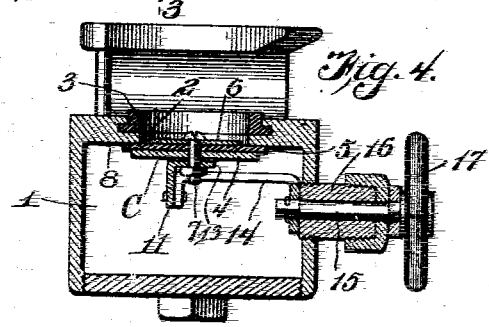
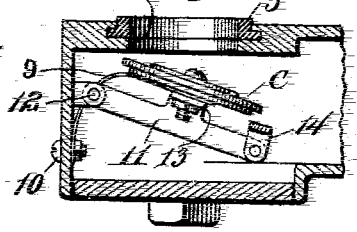
Witnesses
Louis R. Heinrichs
C. Bradway
Inventor
Ira I. Rose
By Victor J. Evans
Attorney

UNITED STATES PATENT OFFICE.

IRA I. ROSE, OF THEBES, ILLINOIS.

HOSE-COUPLING.

939,096.  Specification of Letters Patent.  Patented Nov. 2, 1909.

Application filed September 4, 1908. Serial No. 451,686.

*To all whom it may concern:*

Be it known that I, IRA I. ROSE, a citizen of the United States, residing at Thebes, in the county of Alexander and State of Illinois, have invented new and useful Improvements in Hose-Couplings, of which the following is a specification.

This invention relates to hose couplers for air brake systems, and relates more particularly to a valve attachment for the couplers designed to take the place of the usual angle cocks and adapted to automatically open and close by the coupling and uncoupling of the parts.

The invention has for one of its objects to provide a device of this character which is of comparatively simple and inexpensive construction, reliable and efficient in use and readily manipulated.

Another object of the invention is the provision of a valve device for a coupling member so arranged as to be automatically opened by the connection of the two coupling members of the coupler and which will automatically close when the members are pulled apart by the parting of the train, the closing of the valve however occurring at such time as to permit the brakes of the train to set before the valve is completely closed.

Another object of the invention is the provision of means whereby the valve can be manually opened as in bleeding the train pipe.

With these objects in view and others as will appear as the description proceeds the invention comprises the various novel features of construction and arrangement of parts hereinafter fully described and particularly set forth in the claims appended hereto.

In the accompanying drawing which illustrates one of the embodiments of the invention; Figure 1 is a perspective view of the coupling device with the members connected. Fig. 2 is a plan view of one of the coupling members. Fig. 3 is a section on line 3—3, Fig. 2. Fig. 4 is a section on line 4—4, Fig. 2. Fig. 5 is a fragmentary section similar to Fig. 3 showing the valve in open position.

Similar reference characters are employed to designate corresponding parts throughout the several views.

In the present instance I have shown the valve device applied to only one member of the coupling, it being understood, however, that both coupling members may be equipped with the valves so that when the members are disconnected the valves will automatically close and retain the air in the train pipe.

Referring to the drawing, A designates the coupling member to which the valve device is applied and B the companion coupling member, which, in the present instance, is of ordinary design and is intended to be used with an angle cock, the member A being so designed that it may be used with one of similar construction or with a coupling member of standard form now in common use. The coupling member A is provided with the usual air chamber 1 that has an opening 2 adapted to register with a corresponding opening of the coupling B, there being packing gaskets 3 for making an air tight joint between the members at the opening thereof. Within the chamber 1 is a valve C for opening and closing the opening 2. This valve may be of any suitable construction and in the present instance consists of a disk 4 faced by a piece of rubber 5 that is clamped between the washer 6 and disk 4 by a bolt 7, the rubber part 5 being adapted to seat against the upper wall 8 of the casing so as to effectively prevent the escape of air when the valve is closed. This valve is held in closed position by a spring 9 fastened to the valve by the bolt 7 and also fastened to the shoulder of the member A by a bolt 10 as clearly shown in Figs. 3 and 5.

Arranged within the chamber 1 and extending across the valve is a lever 11 that is fulcrumed at 12 and carries the valve by means of an arm 13 through which the bolt 7 passes. This lever is adapted to be actuated by means exterior to the chamber 1. The free end of the lever 11 is hingedly connected to an actuating arm 14 that is connected to a rock shaft 15 journaled in a bearing 16 carried by the coupling member A, and on the outer end of this shaft is a hand wheel 17 whereby the valve can be manually opened when it is desired to permit air to leave the train pipe. In order that the valve may be automatically opened by the connecting of the coupling members A and B an L-shaped member or arm 18 is secured to the projecting end of the rock shaft so as to turn therewith, and on the free end of this arm is a cam device or actuator 19 that is hingedly connected at 20 with the arm, the cam device being so arranged as to strike the lip 21 on the coupling member B so that during the last part of the connecting movement of the members A and B the shaft 15 will be rocked to swing the lever 11 against the tension of the spring 9 and thus open the valve C automatically. In order to retain the cam device 19 in operative position so as to engage the lip 21 a retaining finger 22 is formed on the cam device to engage the lip 23 on the member A, thus when the coupling A is loosed as when uncoupling the parts 19 and 22 will engage at opposite sides of the flange so that the cam device will always be in proper place. In case the coupling member should pull apart by the train parting the lip 21 will move out of engagement with the part 19 so that the spring 9 will be free to act for closing the valve. The valve C also serves as a closure for the coupling member when the car is detached and stationed on a siding or in a yard so that sand and dust cannot enter the train pipe. Furthermore the valve takes the place of the usual angle cocks and great time is thereby saved since the brakemen do not have to give any attention to manually opening the valves of a train pipe since these valves are automatically opened by coupling the pipes of the cars together.

From the foregoing description, taken in connection with the accompanying drawing, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative and that such changes may be made when desired as are within the scope of the claims appended hereto.

Having thus described the invention, what is claimed as new is:—

1. A coupling of the character described comprising coöperating complemental members, a valve arranged within one of the members, a spring normally exerting a force to hold the valve seated, a pivoted support carrying said valve, a rock shaft mounted upon the member, connecting means between said rock shaft and pivoted support to effect unseating of the valve, and actuating means applied to the projecting end of the rock shaft to admit of the same being operated by hand or automatically by coöperation with a projecting part of the companion member when both members of the coupling are assembled.

2. A coupling of the character described, comprising coöperating companion members, one of said members having a cam projection and the other member having an automatic closing valve, a rock shaft mounted upon the last mentioned member, connecting means between said rock shaft and valve to effect unseating of the latter, a hand piece fitted to the projecting end of the rock shaft, an arm secured to the rock shaft to turn therewith, an actuator pivotally connected with said arm and adapted to engage the cam projection of the first-mentioned member to effect automatic opening of the valve when the members of the coupling are assembled, a retaining device connected with said actuator, and a projecting part applied to said second member to coöperate with the retainer for holding the actuator in proper working position.

3. In a coupling of the character described comprising coöperating complemental members, the combination of a valve located within one of said members and adapted to close the opening thereof, a pivoted support carrying said valve, a spring normally holding the valve closed, a rock shaft mounted in the member, connecting means between the inner end of the rock shaft and pivoted support to effect unseating of the valve, a hand piece applied to the projecting end of the rock shaft, an arm secured to the projecting end of the rock shaft to turn therewith, an actuator pivoted to said arm and adapted to coöperate with a cam portion of the mating member to effect automatic unseating of the valve when the members of the coupling are assembled, a retainer connected with said actuator, and a projecting part extended from said member and coöperating with the retainer to hold the actuator in position to insure its coöperation with the cam portion of the mating member when the parts of the coupling are placed together.

In testimony whereof I affix my signature in presence of two witnesses.

IRA I. ROSE.

Witnesses:
A. SMITH,
R. BROWN.